United States Patent [19]

Tang

[11] Patent Number: 5,016,242

[45] Date of Patent: May 14, 1991

[54] MICROWAVE SUBCARRIER GENERATION FOR FIBER OPTIC SYSTEMS

[75] Inventor: Douglas D. Tang, Chelmsford, Mass.

[73] Assignee: GTE Laboratories Incorporated, Waltham, Mass.

[21] Appl. No.: 265,628

[22] Filed: Nov. 1, 1988

[51] Int. Cl.$^5$ .......................................... H04J 14/02
[52] U.S. Cl. ...................................................... 370/3
[58] Field of Search .................. 370/1, 2, 3; 455/600, 455/619, 618, 617, 612, 611; 372/22

[56] References Cited

U.S. PATENT DOCUMENTS

| | | | |
|---|---|---|---|
| 4,236,243 | 11/1980 | Davies | 370/3 |
| 4,468,766 | 8/1984 | Spezio | 455/619 |
| 4,625,305 | 11/1986 | Epworth | 455/610 |
| 4,635,246 | 1/1987 | Taylor | 370/3 |
| 4,685,773 | 8/1987 | Carlsen | 370/2 |
| 4,726,011 | 2/1988 | Ih et al. | 370/3 |

OTHER PUBLICATIONS

Microwave Multiplexing Techniques . . . Distribution Networks, Olshansky et al., IEEE Intl. Microwave Symp. Dig., pp. 901-903, 1988.
Subcarrier Multiplexing for Multiple-Access Lightwave Networks, T. E. Darcie, IEEE J. of Lightwave Tech., LT-5, No. 6, pp. 1103-1110, Aug. 1987.

Primary Examiner—Donald O. Woodiel
Assistant Examiner—L. Van Beek
Attorney, Agent, or Firm—Victor F. Lohmann, III

[57] ABSTRACT

A method for generating a large number of stable microwave frequency components for wideband lightwave distribution networks is shown. A single oscillator is used at a transmitter to provide all of the required subcarriers. The subcarriers are modulated by high data rate channels and then multiplexed for transmission over a fiber optic line. At a receiver, all of the tuning frequencies required for channel selection are generated by a single oscillator.

32 Claims, 5 Drawing Sheets (sheet 1 of 2)

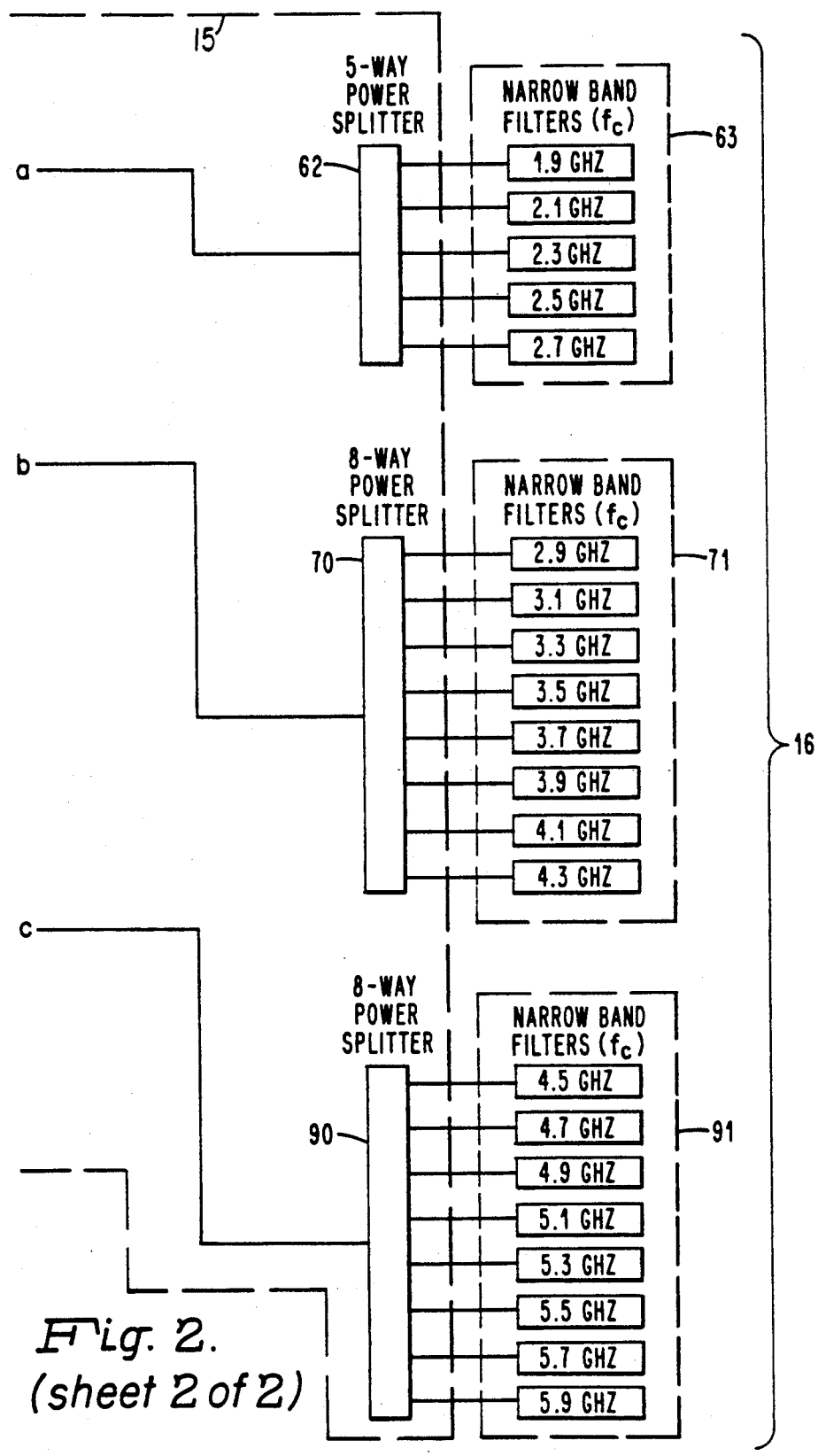
Fig. 2. (sheet 2 of 2)

MICROWAVE SUBCARRIER GENERATION FOR FIBER OPTIC SYSTEMS

FIELD OF THE INVENTION

This invention relates to microwave frequency division multiplexing systems and more particularly to the generation of the microwave subcarriers in a transmitter and the tuning frequencies in a receiver.

BACKGROUND OF THE INVENTION

Fiber optic systems are used in high data rate local area network applications because of the extremely wide bandwidth that is available. Current LANS are characterized by multiple users who require simultaneous transmission of large bandwidth data, such as in video applications. The development of high frequency lasers with bandwidths of 10 GHz or more has made high data rate, multi-channel transmission systems possible. Two multiplex transmission schemes, frequency division multiplexing (FDM) and time division multiplexing (TDM), are practical approaches to utilizing the large bandwidth provided by fiber optics.

FDM is the preferred technique when system flexibility is a consideration. FDM allows a mixed transmission of analog and digitally modulated carriers, whereas TDM is only used in digital systems. Furthermore, transmission channels can be more easily added or deleted with FDM. Adding a new channel in a TDM system increases the total output data rate, thus requiring a new clock frequency and frame synchronization code. There is no resultant benefit in increased transmission signal strength when a TDM channel is deleted because the channel is simply replaced by a dummy data stream in order to maintain the same output data rate. Alternatively, channels can be added in FDM without disturbing the system. The removal of a channel in FDM results in improved performance because the extra power can be distributed equally among the remaining channels.

When FDM is chosen as the multiplexing scheme, the most important consideration, particularly in multichannel, high bandwidth transmissions, is the generation of stable microwave subcarriers at the transmitter and local oscillator frequencies at the receiver. In the transmitter of an FDM system, it is very important that the frequencies of all subcarriers are extremely stable since adjacent-channel interference will occur if the frequency spacing between channels is not maintained under all operating conditions.

Conventional FDM systems transmitting a small number of channels generate the subcarrier frequencies with individual stable oscillators. This is adequate for a few channels, but for a system with a large number of channels this method is expensive, complex due to the DC wiring required, and inefficient in power consumption. At the receiver end, the channel selection is performed by tuning a voltage controlled oscillator. In a coherent MPSK system, the instability of the VCO frequency due to temperature drifts can cause loss of receiver synchronization and resultant loss of data.

In U.S. Pat. No. 4,726,011 granted to Ih et al., coherent optical carriers are generated at the transmission end by optical frequency shifting or injection-locking two or more lasers. In the optical frequency shifting approach, a reference beam from a single-mode laser diode is frequency shifted by the desired amount by sending it through a Traveling-Wave-Acousto-Optical-Modulator. The frequency-shifted beam is used to injection-lock a transmitting laser. This approach is not desired because it is inefficient and cumbersome to continually frequency-shift the reference laser beam when multiple carriers are needed.

An alternative way of generating optical carriers is to injection-lock a plurality of transmitting lasers to the sidebands of an FM modulated injection laser. When an injection laser is modulated near its resonant frequency, a large FM modulation will result. If the modulation index is properly adjusted, a large number of sidebands are generated. Although providing multiple carriers, this alternative has high power consumption because of the multiplicity of lasers used.

"Microwave Multiplexing Techniques for Wideband Lightwave Distribution Networks" by Olshansky et al., IEEE International Microwave Symposium Digest, 1988, promotes the use of multiplexed microwave subcarriers in providing wideband transmissions over optical fiber networks. The required microwave subcarriers are generated with a voltage controlled oscillator that is digitally modulated by FSK or frequency modulated with an analog signal. The instability of the VCO frequency due to temperature drifts may cause spectrum overlap among adjacent information channels.

"Subcarrier Multiplexing for Multiple-Access Lightwave Networks" by T.E. Darcie, IEEE Journal of Lightwave Technology, 1987, proposes a subcarrier multiplexing scheme where multiple channels are transmitted over a fiber optic link. The subcarriers, modulated by frequency shift keying (FSK), are generated by a voltage-controlled oscillator which introduces speed limitations because the oscillator cannot respond instantaneously to the voltage transitions. When data is applied to the VCO, some time is required to establish oscillations at each frequency and, unless the settling time of the VCO is extremely short, some undesired amplitude modulation will accompany the FSK signal. Furthermore, the shunt capacitance of the varactor diode can effectively low-pass filter the signal applied to the varactor and distort the FSK spectrum. At the receiving end of this system, a phase-locked loop FSK demodulator is used wherein a VCO tracks the subcarrier frequency of a desired channel.

OBJECTS OF THE INVENTION

Accordingly, it is a primary object of this invention to obviate the above noted and other disadvantages of the prior art.

It is a further object of this invention to provide a novel method of generating a large number of stable microwave subcarriers for transmission systems.

It is a further object of this invention to provide microwave subcarriers with a single oscillator.

It is a further object of this invention to provide microwave subcarriers with optimum power efficiency.

It is a still further object of this invention to provide a frequency division multiplexed transmission system with stable microwave subcarriers.

It is a still further object of this invention to provide a novel method of generating stable tuning frequencies for receivers.

It is a yet further object of this invention to provide a receiver with the capability to simply generate tuning frequencies required in heterodyne detection.

SUMMARY OF THE INVENTION

In one aspect of this invention the above and other objects and advantages are achieved by a method of generating a plurality of equally spaced microwave frequencies coherently related to a fundamental frequency. The method includes a comb generator for generating a plurality of harmonics from a single local oscillator, a means for equalizing the power of the harmonics, a distribution means connected to the equalization means for equally dividing the power of the harmonic spectrum among a plurality of replicate spectrums, and a bank of narrowband filters to filter out the desired subcarrier frequencies.

In another aspect the microwave frequency generation means is employed in a multi-channel FDM transmission system for providing a plurality of microwave subcarriers. A modulating means impresses a plurality of digital signals on the subcarriers. The modulated subcarriers are coupled to a filtering means for rejecting adjacent channel interference. A multiplexing means combines the modulated subcarrier spectrums into a composite spectrum that is output to a laser source providing the means for optical transmission.

In another aspect the microwave frequency generation means provides the tuning frequencies for a receiver's heterodyne detection means. At the receiving end of an optical transmission channel, a photodetection means provides a microwave spectrum to the heterodyne detection means. The frequency generation means provides a spectrum of harmonics to a filtering means from which two frequency components are applied to heterodyne detection means. The harmonics from the filtering means are appropriately chosen to downconvert a selected one of the modulated subcarrier channels to a first intermediate frequency and then a second, but lower, IF. The first IF spectrum is processed by an IF filtering means before its frequency conversion to the second IF. A synchronous detection means coupled to a carrier recovery means extracts the baseband signal from the IF spectrum.

PREFERRED EMBODIMENT

Figure 1:
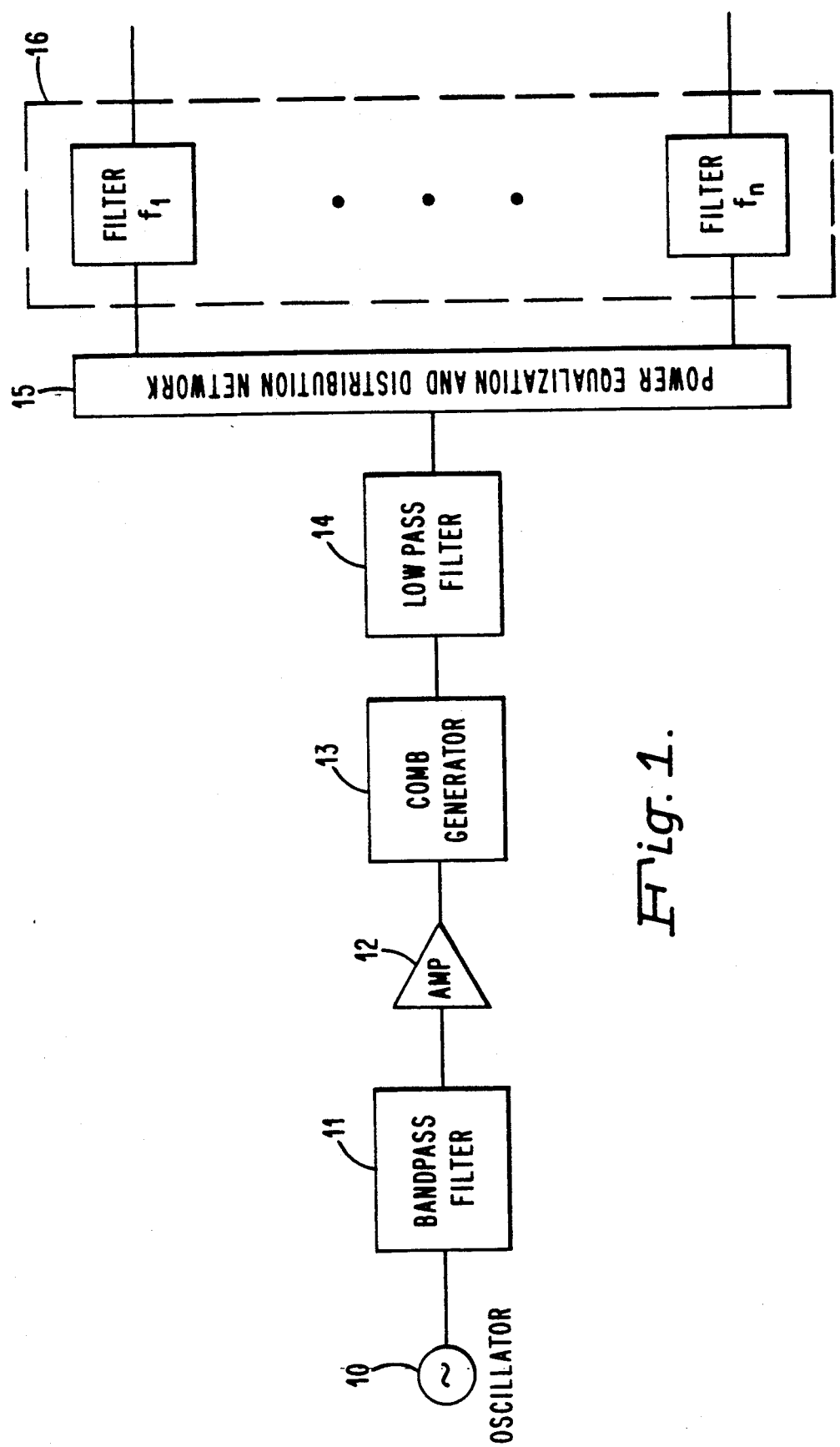
FIG. 1 is a block diagram of the microwave frequency generation means.

FIG. 1 illustrates the generation of a plurality of microwave subcarriers employed in the transmission of information signals according to the invention. The subcarriers are coherently related to a local oscillator (LO) frequency and spaced at an integral multiple of the LO frequency. Referring to FIG. 1, the signal from local oscillator 10 is processed by filter 11 and amplifier 12 and then input to comb generator 13. The resultant spectrum of harmonics from the comb generator passes through low pass filter 14. The finite spectrum of harmonics is then processed by a power equalization and distribution network 15 that coincidentally equalizes the power of the harmonics and reproduces the spectrum for distribution among a plurality of output channels. The power network includes several interconnected stages of power combiners and power splitters. The replicate spectrums from network 15 are input to a plurality of narrowband filters 16 with center frequencies $f_1, \ldots, f_n$. Each filter output is the spectrum of a single harmonic that may be used as a microwave subcarrier in an FDM system. The structure of block 15 is provided in more detail in FIG. 2, which describes a preferred embodiment of the system. Block 15 in FIG. 1 corresponds to the outlined block 15 in FIG. 2.

Figure 2:
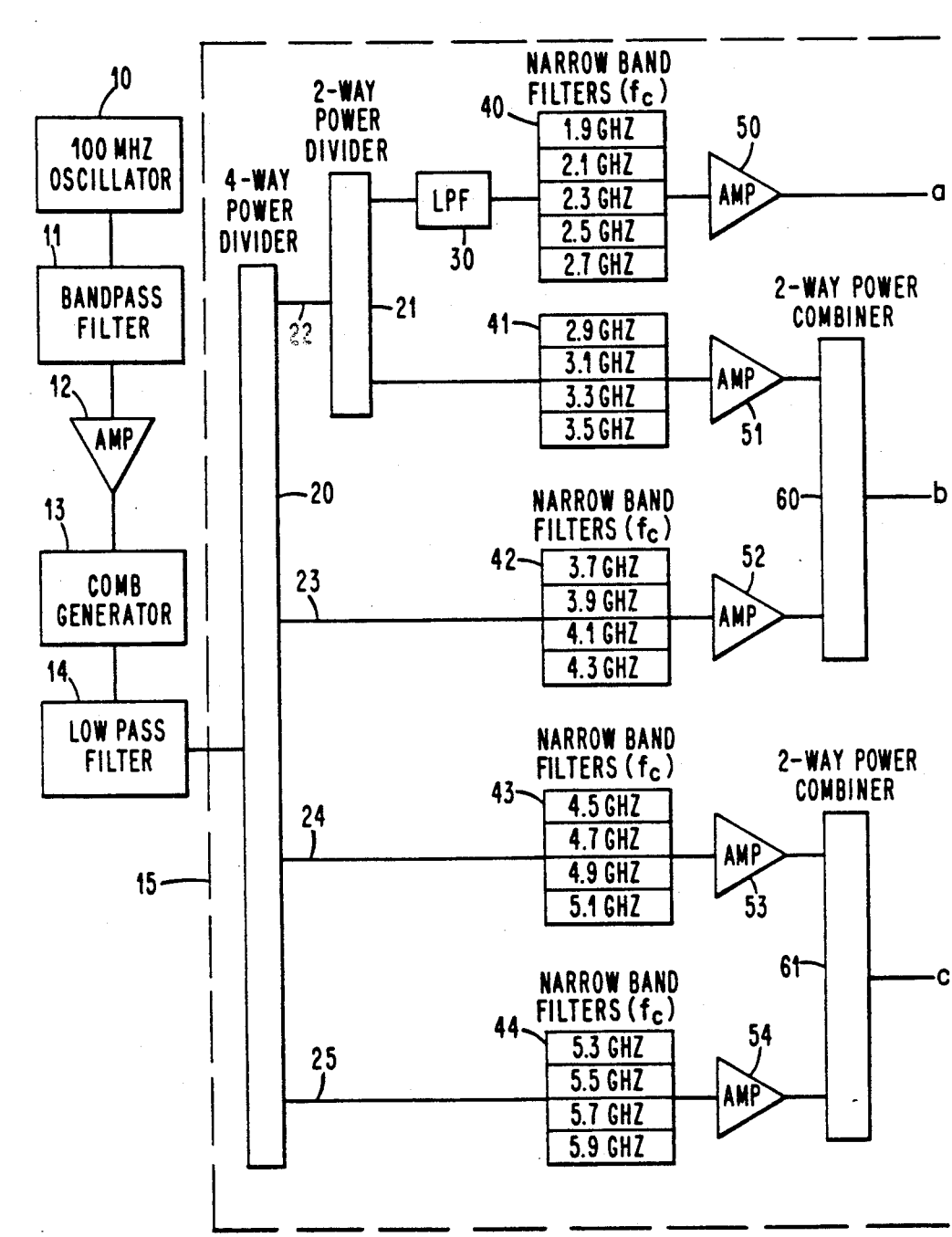
FIG. 2 is a detailed block diagram of FIG. 1 in accordance with a preferred embodiment of the invention.

In the preferred embodiment of FIG. 2 according to the present invention, a 100 MHz signal from temperature-compensated crystal-controlled oscillator 10 is initially processed by bandpass filter 11 to filter out any spurious signals accompanying the 100 MHz sinusoid. A 1W amplifier 12 provides the 100 MHz signal with adequate power to drive comb generator 13. The comb generator is essentially a very fast snap varactor, properly biased to give a very small conduction angle, resulting in very short output pulses at a repetition rate of the input frequency (100 MHz). Thus, the output of the comb generator is a spectrum of harmonics coherently related to the 100 MHz sinusoid. The amplitude of the harmonics decreases approximately as $1/n$, where n is the order of the harmonic. The harmonics, hereafter also referred to as the microwave subcarriers, have a frequency stability of $\pm/-6$ kHz at the highest operating frequency over an operational temperature range of $-30°$ C. to $+70°$ C.

The plurality of varying-amplitude 100 MHz harmonics is filtered by low pass filter 14 having a 7 GHz cutoff frequency. The resultant spectrum of harmonics from 100 MHz to 7 GHz is then input to 4-way power divider 20 for dividing and distributing the power of the harmonic spectrum among four output channels 22, 23, 24, and 25. Channel 22 is input to 2-way power divider 21; channel 23 is input to block 42 of narrowband filters; channel 24 is input to block 43 of narrowband filters; and channel 25 is input to block 44 of narrowband filters. Each channel carries the spectrum of harmonics from 100 MHz to 7 GHz.

Two-way power-divider 21 halves the spectrum power from input channel 22 and directs one of the half-power spectrums to low pass filter (LPF) 30 and the other half-power spectrum to narrowband filter block 41. LPF 30 has a cutoff frequency of 3.5 GHz. The output of LPF 30 is input to filter block 40, which consists of a set of five narrowband filters centered at 1.9 GHz, 2.1 GHz, 2.3 GHz, 2.5 GHz and 2.7 GHz. Filter block 41 consists of a set of four narrow-band filters centered at 2.9 GHz, 3.1 GHz, 3.3 GHz and 3.5 GHz. The narrowband filters for each block are interconnected by circulators such that the input spectrum is applied to each narrowband filter while the output spectrum of the block is a composite spectrum of the outputs from that block's particular set of narrowband filters. For example, the input to filter block 40 is a spectrum of harmonics from 100 MHz to 3.5 GHz and the output is a spectrum of components at 1.9 GHz, 2.1 GHz, 2.3 GHz, 2.5 GHz and 2.7 GHz.

The output spectrum from filter block 40, comprising frequency components at 1.9 GHz, 2.1 GHz, 2.3 GHz, 2.5 GHz and 2.7 GHz, is applied to amplifier 50 of gain 35 dB. Similarly, the output spectrum from filter block 41, comprising sinusoids at 2.9 GHz, 3.1 GHz, 3.3 GHz and 3.5 GHz, is applied to amplifier 51 of gain 35 dB.

The spectral frequencies at the output of amplifiers 50 and 51 each have a 9 dBm power level.

Filter block 42 consists of a set of four narrowband filters centered at 3.7 GHz, 3.9 GHz, 4.1 GHz and 4.3 GHz; filter block 43 consists of a set of four narrowband filters centered at 4.5 GHz, 4.7 GHz, 4.9 GHz and 5.1 GHz; and filter block 44 consists of a set of four narrowband filters centered at 5.3 GHz, 5.5 GHz, 5.7 GHz and 5.9 GHz. The input spectrum for each filter block is the spectrum of harmonics from 100 MHz to 7 GHz. The narrowband filters for each block are interconnected by circulators such that the input spectrum is applied to each narrowband filter while the output spectrum of the block is a composite spectrum of the outputs from that block's particular set of narrowband filters. For example, the output of filter block 42 is a spectrum of components at 3.7 GHz, 3.9 GHz, 4.1 GHz and 4.3 GHz. The output spectra from filter blocks 42, 43 and 44 are applied to amplifiers 52, 53 and 54, respectively. Amplifiers 53 and 54 have 35 dB gain while amplifier 52 has a 26 dB gain. The individual frequency components of each amplified spectrum have a 9 dBm power level.

The spectrum from amplifier 50 is applied to 5-way power splitter 62, which divides and distributes the spectrum power among five output channels. The power splitter in conjunction with an attenuator reduce the power level of each frequency component from 9 dBm to 0 dBm. Each of the power splitter's output channels is input to one of five narrowband filters 63 centered at 1.9 GHz, 2.1 GHz, 2.3 GHz, 2.5 GHz and 2.7 GHz. Each of the filters extracts a different frequency component from the input spectrum and places it on a corresponding output channel.

The individual spectra from amplifiers 51 and 52 are combined in 2-way combiner 60, providing a single spectrum with components from 2.9 GHz to 4.3 GHz at 200 MHz intervals. The individual spectra from amplifiers 53 and 54 are combined into a single spectrum by 2-way power combiner 61. The combined spectrum is comprised of components from 4.5 GHz to 5.9 GHz at 200 MHz intervals. The spectral frequencies of both composite spectrums each have a 6 dBm power level. Eight-way power splitter 90 equally divides and distributes the spectrum power from power combiner 61 among eight output channels. Likewise, the spectrum power from power combiner 60 is equally divided and distributed by 8-way power splitter 70 among eight output channels. The power splitter reduces the power level of each spectral component from 6 dBm to −3 dBm. Each of the output channels from power splitter 70 is input to one of eight narrowband filters 71 centered at 2.9 GHz, 3.1 GHz, 3.3 GHz, 3.5 GHz, 3.7 GHz, 3.9 GHz, 4.1 GHz and 4.3 GHz, while each of the output channels from 90 is similarly input to one of eight narrowband filters 91 centered at 4.5 GHz, 4.7 GHz, 4.9 GHz, 5.1 GHz, 5.3 GHz, 5.5 GHz, 5.7 GHz and 5.9 GHz. Each of the filters extracts a different frequency component from the input spectrum and places it on a corresponding output channel. This completes the generation of microwave subcarriers from 1.9 GHz to 5.9 GHz spaced at 200 MHz intervals.

The above set of harmonically related subcarrier frequencies serves as an exemplary illustration of subcarrier generation according to the present invention, and therefore should not serve as a limitation of the present invention. Accordingly, it should be obvious to those skilled in the art that a different set of subcarrier frequency signals may be generated with the selection of an appropriate oscillator 10 and a group of narrowband filters.

Figure 3:
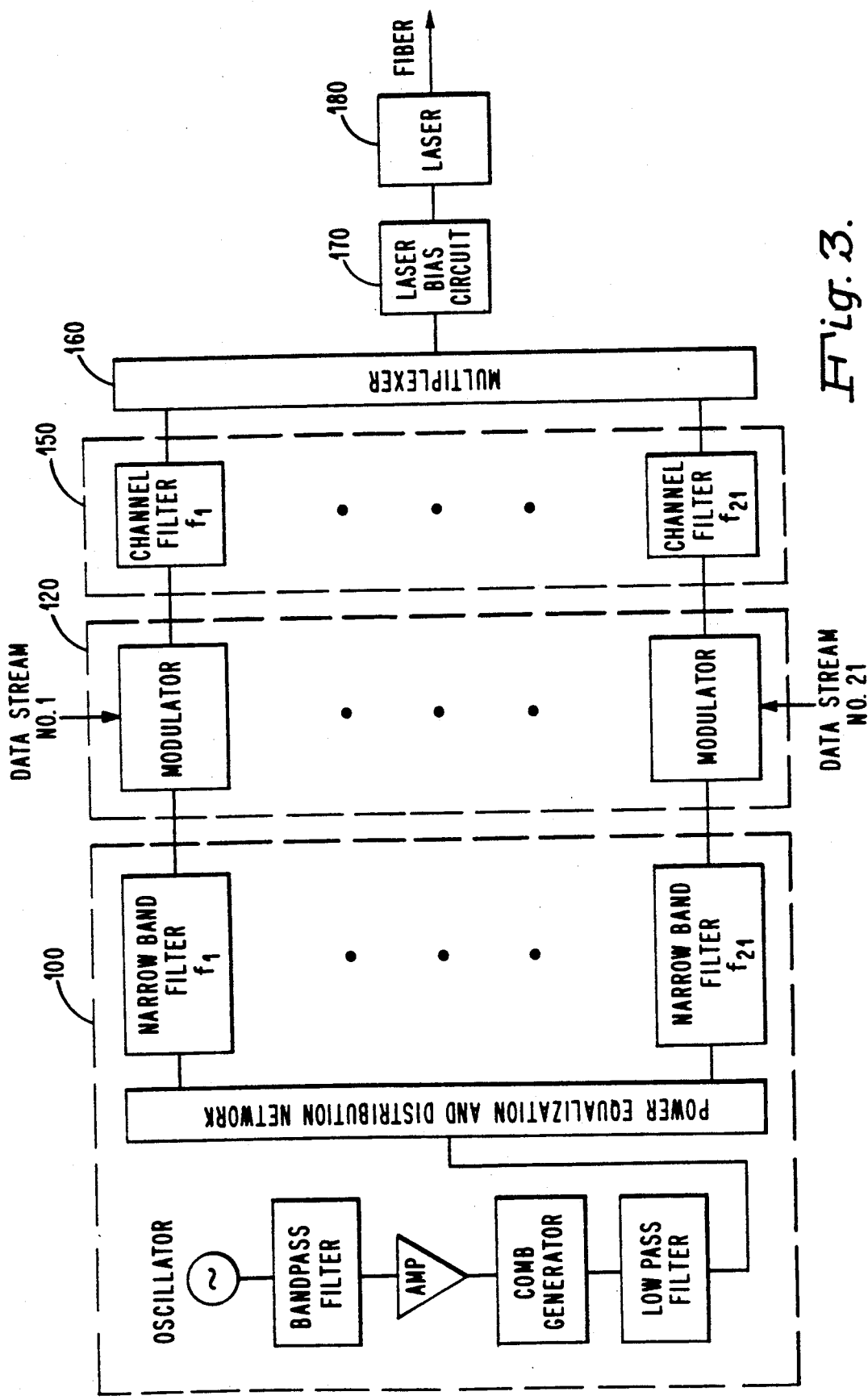
FIG. 3 is a block diagram of an FDM transmission system in accordance with a preferred embodiment of the invention.

FIG. 3 is a preferred embodiment according to the present invention for optically transmitting twenty-one digital channels impressed on individual microwave subcarriers spaced at 200 MHz intervals from 1.9 GHz to 5.9 GHz. The subcarriers appear at the outputs of the set of narrowband filters centered at $f_1, f_2, \ldots f_{21}$. In a video transmission application, the twenty-one digital channels correspond to twenty 107 Mb/s video signals and one 2.04 Mb/s voice/data signal.

The twenty video channels, consisting of sixteen broadcast channels and four video-on-demand channels, are carried on the twenty microwave subcarriers from 2.1 GHz to 5.9 GHz while the 2.04 Mb/s channel is carried on the 1.9 GHz subcarrier. The method for generating microwave subcarriers in FIG. 3 is identical to that in FIG. 2. As such, block 100 in FIG. 3 comprises all of the elements described in FIG. 2.

To effect the transmission, each of the twenty-one subcarriers and a corresponding digital signal are applied to one of the twenty-one BPSK modulators 120. The 1.9 GHz subcarrier is modulated by a 2.04 Mb/s signal while each of the twenty subcarriers from 2.1 GHz to 5.9 GHz is modulated by a 107 Mb/s signals. Each of the twenty-one modulated subcarriers is then applied to one of the channel filters 150. The center frequency of each channel filter, labeled as $f_1, f_2, \ldots f_{21}$, corresponds to the subcarrier frequency of its input spectrum. The channel filters for the modulated subcarriers have a bandwidth of 130 MHz. The channel filters reject adjacent channel interference that may have been introduced by the modulation process.

In the system under discussion, BPSK modulation was used for three important reasons: for the same error rate performance, BPSK requires an electrical $E_b/N_o$ 3 dB less than that required by coherent orthogonal FSK; an external BPSK modulator can operate at data rates of several hundred Mb/s, whereas direct FSK modulation of VCO is limited to about 50 Mb/s due to the low pass effect of the tuning varactor; and the individual VCOs required for each subcarrier in FSK modulation have very poor frequency stability in the absence of external stabilization.

The modulated microwave subcarriers are combined by frequency division multiplexer 160 to form a single spectrum that intensity modulates a 1.3 μm laser 180 via a bias network 170. Laser 180, operating at an intensity modulation depth of 5% per channel, provides 1 mW of output power.

It should be obvious to those skilled in the art that the above embodiment of FIG. 3 may be modified without departing from the scope of the present invention. For example, a different oscillator and group of narrowband filters would provide a new set of harmonically related subcarrier frequencies, a different optical transmission apparatus could replace bias circuit 170 and laser 180, and baseband signals with data rates other than 107 Mb/s and 2.04 Mb/s may be transmitted.

Figure 4:
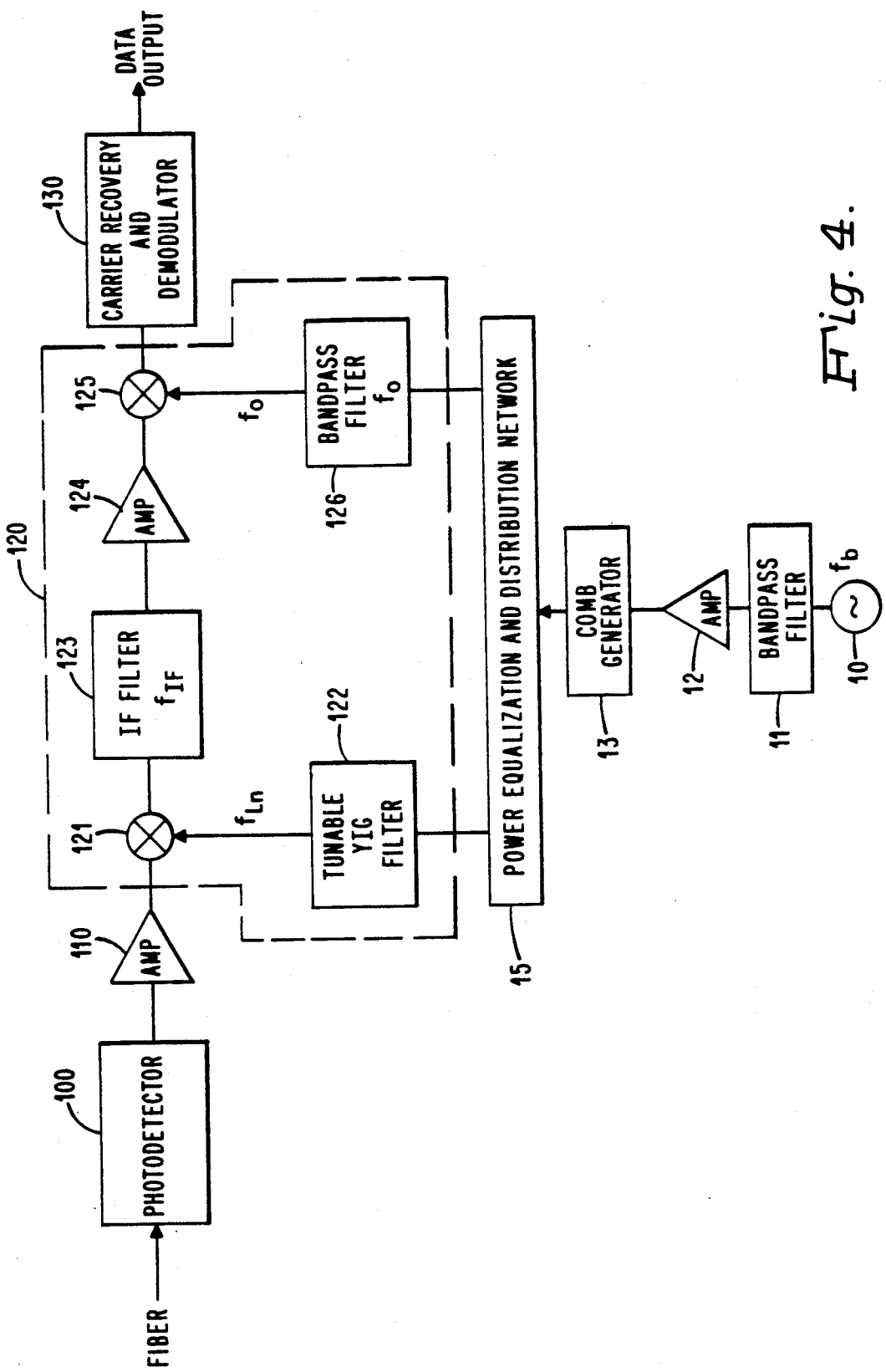
FIG. 4 is a block diagram of a double-conversion receiver in accordance with a preferred embodiment of the invention.

FIG. 4 is a preferred embodiment according to the present invention for providing the tuning frequencies at the receiving end of a transmission system wherein a selected channel is recovered from the optical signal transmitted in FIG. 3. The tuning frequencies ($F_{Ln}$ and $f_o$) are generated by means similar to that described in FIG. 1.

PIN diode detector 100, coupled to the fiber link at an input end, receives the optical spectrum and provides a corresponding microwave spectrum with a power level of −75 dBm per channel. Each channel corresponds to the spectrum of a modulated microwave subcarrier. The microwave spectrum is processed by amplifier 110 and then applied to the double conversion microwave receiver 120 for heterodyne detection.

Receiver 120 downconverts the spectrum of a channel selected by the subscriber to a first intermediate frequency, filters the IF spectrum, and then downconverts the filtered IF spectrum to a second, but lower, intermediate frequency. The second IF is low enough to permit the use of standard demodulation techniques. Double-conversion is a preferred technique in heterodyne detection because the large first IF improves image rejection in the RF region, while the smaller second IF improves carrier recovery and the demodulation process.

In receiver 120, the microwave spectrum is applied to mixer 121 along with a sinusoid of frequency $f_{Ln}$ from voltage-tunable YIG filter 122. Filter 122 is tuned to the appropriate frequency fln so that mixer 121 will downconvert the subcarrier of the selected channel to the predetermined first intermediate frequency (IF). The following relationship among frequencies is followed:

$$f_{Ln} = f_{IF} + f_n \quad (1)$$

where $f_{IF}$ is the intermediate frequency, $f_n$ is the subcarrier frequency of the selected channel n, and $f_{Ln}$ is the tuned frequency of the YIG filter. More generally, the equations:

$$f_{Ln} = f_{LI} + (n-1)f_s \quad (2)$$

$$f_{LI} = f_{IF} + f_1 \quad (3)$$

define the frequency selection. In our embodiment, $f_{IF}$ is 6.5 GHz, the adjacent channel spacing $f_s$ is 200 MHz, and the subcarrier frequency of the first channel, $f_1$, is 2.1 GHz.

At the output of mixer 121, bandpass filter 123 filters out the selected IF spectrum from the plurality of frequency-converted channel spectrums. The filter has a bandwidth slightly larger than 60% of the channel spacing and a center frequency at the intermediate frequency. The filtered IF spectrum is amplified by amplifier 124 and then applied to mixer 125 along with a sinusoid of frequency $f_o$ from narrowband filter 126. The proper choice of as the center frequency of narrowband filter 126 permits mixer 125 to downconvert the first IF spectrum to a second, but lower, preselected intermediate frequency. In a preferred embodiment, the fixed of equals 8.2 GHz and the second IF is 1.7 GHz.

The inputs to YIG filter 122 and narrowband filter 126 are spectrums of frequency components coherently related to fundamental frequency $f_b$. The means for generating the plurality of harmonics is similar to that in FIG. 1. The fundamental frequency, $f_b$, is chosen so that the comb generator 13 output includes a component at of and a set of harmonics, denoted by $f_{Ln}$, that obey equation (1) for all microwave subcarriers f1, f2, . . . , fn, where n equals the number of channels.

The selected channel, now at the second IF, is demodulated by synchronous detector 130 to separate the digital signal from the modulated subcarrier. Two methods are used to provide a synchronous signal for carrier recovery. One method uses a conventional phased-lock loop technique while the other method uses a frequency divider to recover the carrier directly from the spectrum.

What is claimed is:

1. A method of optically transmitting a plurality of information signals, comprising the steps of:
    generating a plurality of harmonics from a single oscillator of prespecified fundamental microwave frequency to provide an input harmonic spectrum;
    providing a set of replicate harmonic spectrums each having a frequency spectrum identical to that of said input harmonic spectrum;
    filtering each of said replicate spectrums to selectively extract therefrom a respective harmonic for use as a microwave subcarrier signal;
    modulating each of said subcarrier signals with a respective one of said information signals:
    summing said modulated subcarrier signals to form a composite optical signal; and
    optically transmitting said composite optical signal.

2. The method as recited in claim 1 wherein:
    the step of generating a plurality of harmonics includes the step of non-linear processing of said fundamental frequency signal to yield said harmonics.

3. The method as recited in claim 1 wherein:
    the step of filtering includes the steps of passing each of said replicate spectrum through a respective narrowband filter adapted to pass a respective one of said selected harmonics.

4. The method as recited in claim 2 wherein:
    the step of non-linear processing includes the step of generating output pulses with a comb generator at a repetition rate of said fundamental frequency.

5. A method of receiving an optical signal having a plurality of modulated microwave subcarrier channels and recovering the baseband signal of a selected channel, comprising the steps of:
    generating a plurality of harmonics from a single oscillator of prespecified fundamental frequency to provide an input harmonic spectrum;
    generating a set of replicate harmonic spectrums each having a frequency spectrum identical to that of said input harmonic spectrum;
    filtering each of said replicate spectrums to selectively extract therefrom a respective mixing harmonic;
    detecting said optical signal to provide a corresponding electrical signal;
    heterodyne detecting said electrical signal with said selected mixing harmonics to produce an intermediate frequency signal;
    recovering a carrier frequency signal from said intermediate frequency signal; and
    demodulating said intermediate frequency signal using said carrier frequency signal to recover the baseband signal of said intermediate frequency signal.

6. The method as recited in claim 5 wherein:
    said fundamental frequency is a submultiple of each of said microwave subcarriers.

7. The method as recited in claim 5 wherein:
    the step of generating a plurality of harmonics includes the step of non-linear processing of said fundamental frequency signal to yield said harmonics.

8. The method as recited in claim 6 wherein:

the step of non-linear processing includes the step of generating output pulses with a comb generator at a repetition rate of said fundamental frequency.

9. A system for optically transmitting a plurality of information signals, comprising:
   means for generating a plurality of harmonics from a single oscillator of prespecified fundamental frequency to provide an input harmonic spectrum;
   means for amplifying said input harmonic spectrum;
   means responsive to said input harmonic spectrum for providing a set of replicate harmonic spectrums each having a frequency spectrum identical to that of said input harmonic spectrum;
   first filtering means adapted to receive said set of replicate harmonic spectrums and selectively extract from each replicate spectrum a respective harmonic for use as a microwave subcarrier;
   modulating means coupled to said first filtering means for modulating each of said microwave subcarriers with a respective one of said information signals;
   second filtering means for filtering each of said modulated subcarriers;
   means for summing said modulated subcarrier signals to form a composite optical signal; and
   means for optically transmitting said composite optical signal.

10. The system as recited in claim 9 wherein:
    said means for generating harmonics includes means for non-linear processing of said oscillator signal to provide said input harmonic spectrum.

11. The system as recited in claim 10 wherein:
    said non-linear processing means includes a comb generator for generating output pulses at a repetition rate of said fundamental frequency.

12. The system as recited in claim 11 wherein said comb generator includes a varactor.

13. The system as recited in claim 9 wherein:
    said second filtering means includes a plurality of bandpass filters centered at each of said subcarrier frequencies for rejecting adjacent channel interference.

14. The system as recited in claim 9 wherein:
    said first filtering means includes a plurality of narrowband filters each adapted to pass a respective one of said selected harmonics.

15. A system for receiving an optical signal having a plurality of modulated microwave subcarrier channels and recovering the baseband information signal of a selected channel, comprising:
    photodetection means responsive to said optical signal for providing a corresponding microwave spectrum;
    means for amplifying said microwave spectrum;
    means for generating a plurality of harmonics from a single oscillator of prespecified fundamental frequency to provide an input harmonic spectrum;
    means responsive to said input harmonic spectrum for providing a set of replicate harmonic spectrums each having a frequency spectrum identical to that of said input harmonic spectrum;
    first filtering means responsive to a voltage control signal and adapted to receive one of said replicate harmonic spectrums for filtering out a first selected harmonic from said one replicate harmonic spectrum;
    first heterodyne detection means responsive to said amplified microwave spectrum and said first selected harmonic for downconverting the spectrum of said selected subcarrier channel to a first intermediate frequency;
    second filtering means for bandpass filtering said first intermediate frequency spectrum;
    third filtering means coupled to said means for providing replicate harmonic spectrums for filtering out a second selected harmonic from another of said replicate harmonic spectrums;
    second heterodyne detection means responsive to said second selected harmonic and said bandpass filtered spectrum for downconverting said first intermediate frequency spectrum to a second intermediate frequency;
    carrier recovery means coupled to said second heterodyne detection means for generating a sinusoid synchronized with the carrier frequency of said second intermediate frequency spectrum; and
    demodulation means in combination with said carrier recovery means for synchronously detecting and recovering the baseband signal from said second intermediate frequency spectrum.

16. The system as recited in claim 15 wherein:
    said second filtering means includes a bandpass filter centered at said first intermediate frequency.

17. The system as recited in claim 15 wherein:
    the difference frequency between said second selected harmonic and said first intermediate frequency equals said second intermediate frequency.

18. The system as recited in claim 15 wherein:
    said carrier recovery means includes a phase-lock loop.

19. The system as recited in claim 15 wherein:
    said carrier recovery means includes a frequency divider.

20. The system as recited in claim 15 wherein:
    said fundamental frequency is a submultiple of each of said microwave subcarriers.

21. The system as recited in claim 15 wherein:
    the difference frequency between said first selected harmonic and said selected subcarrier equals said first intermediate.

22. The system as recited in claim 15 wherein said means for generating a plurality of harmonics includes a comb generator generating output pulses at a repetition rate of said fundamental frequency.

23. A system for receiving an optical signal having a plurality of modulated microwave subcarrier channels and recovering the baseband signal from a selected channel, comprising:
    photodetection means responsive to said optical signal for providing a corresponding microwave spectrum;
    means for amplifying said microwave spectrum;
    means for generating a plurality of harmonics from a single oscillator of prespecified fundamental frequency to provide an input harmonic spectrum;
    means responsive to said input harmonic spectrum for providing a set of replicate harmonic spectrums each having a frequency spectrum identical to that of said input harmonic spectrum;
    first filtering means adapted to receive said replicate harmonic spectrums for filtering therefrom a selected first and second harmonic;
    heterodyne detection means responsive to said first harmonic and said amplified microwave spectrum for downconverting the spectrum of said selected channel to a first intermediate frequency and responsive to said second harmonic for downconverting said first intermediate frequency;

second filtering means for bandpass filtering said first intermediate frequency spectrum prior to downconversion to said second intermediate frequency;

carrier recovery means coupled to said heterodyne detection means for generating a sinusoid synchronized with the carrier frequency of said second intermediate frequency spectrum; and demodulation means in combination with said carrier recovery means for synchronously detecting and recovering the baseband signal from said second intermediate frequency spectrum.

24. The system as recited in claim 23 wherein:

said means for generating harmonics includes means for non-linear processing of said fundamental frequency signal to provide said input harmonic spectrum.

25. The system as recited in claim 24 wherein:

said non-linear processing means includes a comb generator for generating output pulses at a repetition rate of said fundamental frequency.

26. The system as recited in claim 25 wherein said comb generator includes a varactor.

27. The system as recited in claim 23 wherein:

said fundamental frequency is a submultiple of each of said microwave subcarriers.

28. A system for optically transmitting a plurality of information signals and receiving a selected one of said information signals, comprising:

means for generating a first plurality of harmonics from a single oscillator of prespecified fundamental frequency to provide a first harmonic spectrum;

means responsive to said first harmonic spectrum for providing a set of first replicate harmonic spectrums each having a frequency spectrum identical to that of said first harmonic spectrum;

filtering means adapted to receive said set of first replicate harmonic spectrums and filter out from each first replicate harmonic spectrum a respective harmonic to serve as a subcarrier;

means for modulating each of said subcarriers with a respective one of said information signals;

means for summing said modulated subcarriers to form a composite optical signal;

means for optically transmitting said composite optical signal;

photodetection means responsive to said transmitted optical signal for providing a corresponding electrical signal;

means for generating a second plurality of harmonics from a single oscillator of said prespecified fundamental frequency to provide a second harmonic spectrum;

means responsive to said second plurality of harmonics for providing a set of second replicate harmonic spectrums each having a frequency spectrum identical to that of said second harmonic spectrum;

filtering means adapted to receive each of said second replicate harmonic spectrums and selectively filter out from each second replicate harmonic spectrum a respective mixing harmonic;

heterodyne detection means responsive to said electrical signal and said mixing harmonics for downconverting a selected subcarrier signal to an intermediate frequency;

carrier recovery means coupled to said heterodyne detection means for generating a sinusoid synchronized with the carrier frequency of said intermediate frequency spectrum; and demodulation means responsive to said sinusoid and said intermediate frequency signal for synchronously detecting and recovering the baseband signal from said intermediate frequency signal.

29. The system as recited in claim 28 wherein said information signals include twenty 107 Mb/s video signals and one 2.04 Mb/s voice/data signal;

said microwave subcarriers include twenty-one subcarrier signals spaced at 200 MHz intervals from 1.9 GHz to 5.9 GHz;

said modulating means includes a Binary Phase Shift Key (BPSK) modulator; and said means for optical transmission includes a laser bias circuit coupled to a laser which emits light at 1.3 $\mu$m.

30. The system as recited in claim 29 wherein said means for generating a first plurality of harmonics includes a first comb generator; and said means for generating a second plurality of harmonics includes a second comb generator.

31. The system as recited in claim 30 wherein said first comb generator includes a varactor; and said second comb generator includes a varactor.

32. A system for optically transmitting a plurality of information signals, comprising:

means for generating a plurality of harmonics from a single oscillator of pre-specified fundamental microwave frequency to provide an input harmonic spectrum;

means responsive to said input harmonic spectrum for providing a set of replicate harmonic spectrums each having a frequency spectrum identical to that of said input harmonic spectrum;

filtering means adapted to receive said set of replicate harmonic spectrums and selectively filter out from each replicate harmonic spectrum a respective harmonic to serve as a microwave subcarrier signal;

means for modulating each of said subcarriers with a respective one of said information signals;

means for summing said modulated subcarriers to provide a composite optical signal; and means for optically transmitting said composite optical signal.

* * * * *